Oct. 9, 1923.

W. G. COX

RESILIENT GUARD FOR AUTOMOBILES

Filed May 4, 1923

1,469,999

2 Sheets-Sheet 1

INVENTOR.
W.G. COX.

Oct. 9, 1923.
W. G. COX
1,469,999
RESILIENT GUARD FOR AUTOMOBILES
Filed May 4, 1923   2 Sheets-Sheet 2
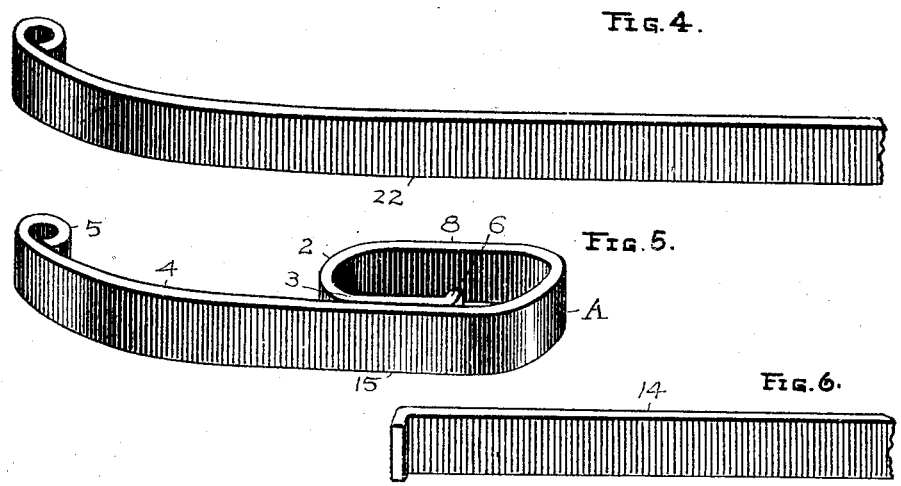
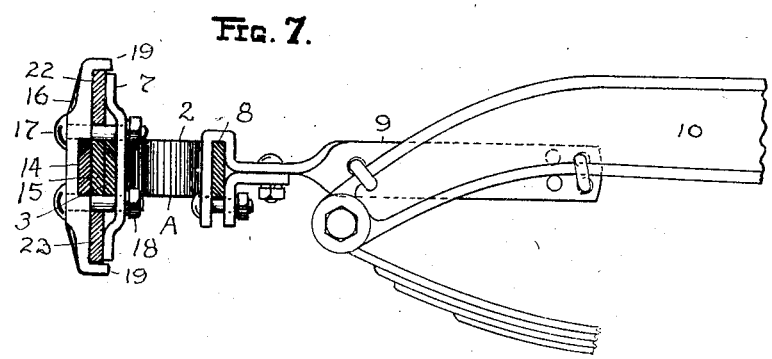
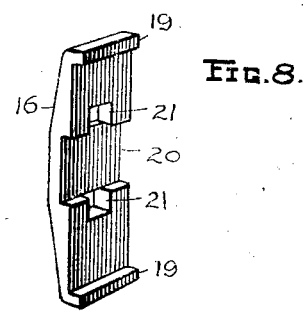
Inventor
W.G.COX.

Patented Oct. 9, 1923.

1,469,999

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

RESILIENT GUARD FOR AUTOMOBILES.

Application filed May 4, 1923. Serial No. 636,533.

*To all whom it may concern:*

Be it known that I, WILLIAM G. COX, a citizen of the United States, residing at Cleveland, in the county of Cuyahoga and State of Ohio, have invented certain new and useful Improvements in Resilient Guards for Automobiles, of which the following is a specification.

My aim is to provide a resilient end guard for motor vehicles, and particularly an end guard suitable for, and capable of, adequately safe-guarding relatively heavy and large automobiles. Thus the guard is constructed with a striking and fending surface of substantial size, which is built up of two relatively long metal strips, a pair of elliptical supporting units having spring arms co-extensive with the end portions of the strips, and a central short connecting strip. Suitable clamping devices unite the said parts together, and the complete guard as viewed from the front appears to be made of three parallel rails or striking members of equal length. The elliptical supporting units are also especially constructed to permit convenient attachment to be made with the projecting side bars of automobiles in general use regardless of the width of the frame, using clamping brackets of any desired design and construction for that purpose, and these supporting units are made of spring steel strips folded or doubled in a way to provide resiliency with sufficient stiffness and stability to carry the combined weight of the parts and to withstand comparatively heavy shocks and blows.

Figure 1:
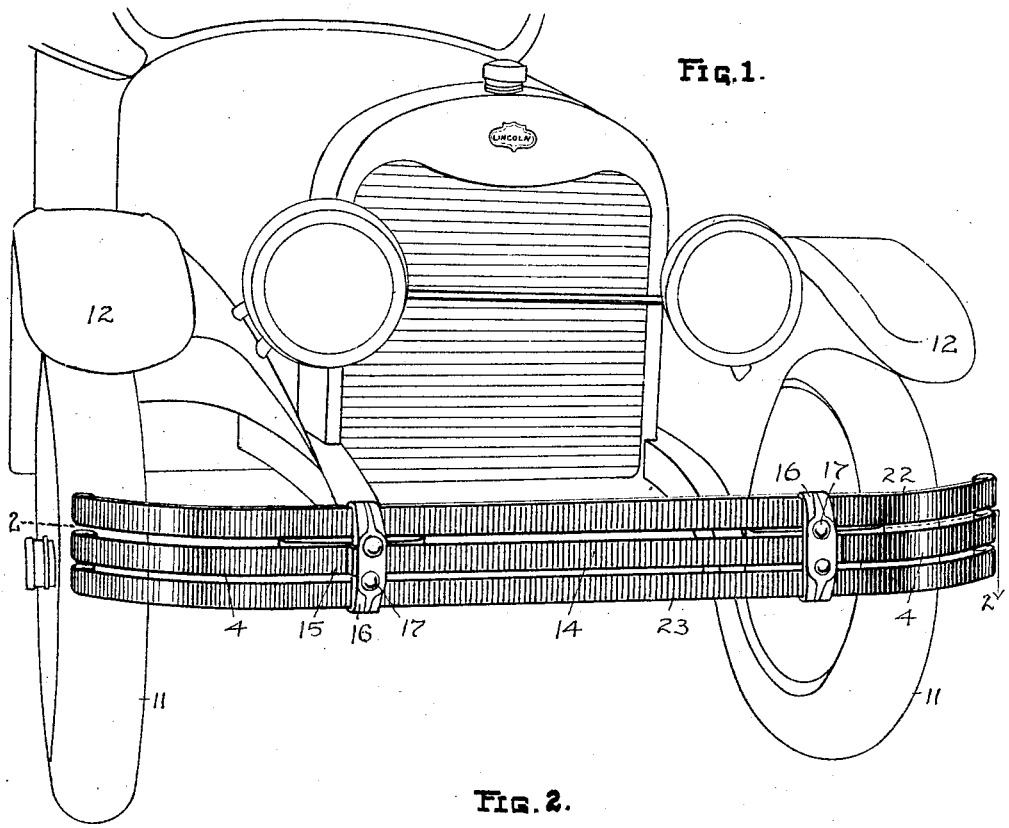
Figure 2:
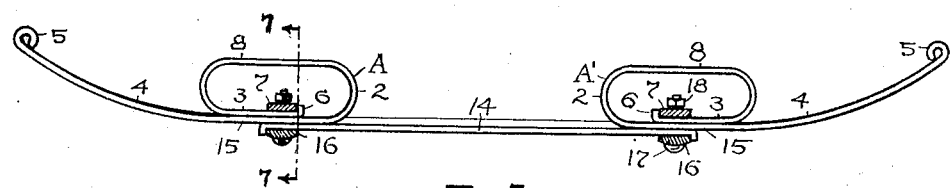
Figure 3:
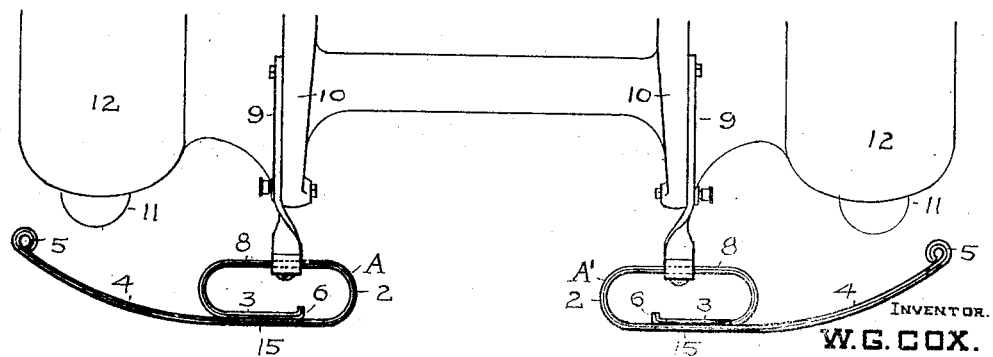

In the accompanying drawings, Fig. 1 is a perspective view of my improved end guard, mounted upon the front end of an automobile. Fig. 2 is a horizontal section and top view of the guard on line 2—2 of Fig. 1. Fig. 3 is a top view of the elliptical supporting units attached to the frame by brackets and without the upper and lower and middle rails or strips. Fig. 4 is an enlarged perspective view of a portion of one of the longer rails or strips. Fig. 5 is a perspective view of one of the elliptical supporting units. Fig. 6 is a perspective view of a portion of the middle connecting rail or strip. Fig. 7 is a side elevation of a portion of the frame of an automobile and a vertical cross section of the guard on line 7—7 of Fig. 2 on the line of attachment with a clamping bracket. Fig. 8 is a perspective view of one of the front clamping plates for holding and tying the guard members together.

The guard comprises duplicate spring supporting units A—A'; each made of a short piece of strap metal folded upon itself to provide a closed elliptical loop 2 having a short inwardly-turned straight leg 3 and a longer curved arm 4 overlapping this leg and forming a free spring extension adapted to function as a spring fending or striking portion of the guard. Arm 4 may terminate in a round eye 5, or rounded and made blunt in any other suitable way, to avoid having sharp projecting edges at the end of the guard, and the extremity of straight leg 3 may be bent rearwardly to provide a short flange or lip 6 wherewith inter-locking may be effected with a clamping plate 7 and separability or pulling apart of the associated pieces is prevented. Loop 2 is elliptical or elongated and formed with a straight rear connecting portion 8 between its rounded ends to permit an adjustable clamping attachment to be made with any suitable kind of bracket, for example, a straight arm bracket 9 bolted to the projecting end portions of the side bars 10 of the vehicle frame substantially as exemplified in Figs. 3 and 7. When two such spring units are attached to the respective side bars of the frame, their respective spring arms 4 extend in opposite directions transversely of the wheels 11 and the mud guards or fenders 12 of the vehicle, and the space between the elliptical loops 2 is open, except as may be otherwise closed when a short connecting strip 14 of spring metal is seated and clamped at the front of the loops of the duplicate units A and A'. This assembly of parts is delineated in Figs. 1 and 2, where the leg 3 in each spring unit bears against the rear of the straight base portion 15 of spring arm 4 and the end of connecting strip 14 lies flat against the front face of said arm portion 15, and these parts are rigidly clamped together by a front clamping member 16, a rear clamping plate 7, and bolts 17 and nuts 18.

Clamping members 16 are relatively long and narrow and formed with rearwardly-extending flanges 19—19 at top and bottom and also with a transverse groove 20 at the rear centrally between said flanges. Square bolt openings 21 are also provided adjacent the upper and lower shoulders of groove 20 and the middle connecting strip 14 of the guard is adapted to occupy groove 20 between the spaced bolts 17 when this strip is to be clamped upon the spring supporting units A and A'. The flanged end portions of clamping members 16 extend a sufficient distance above and below the loop portion of the units to also permit other fending strips or rails to be clamped in rigid parallel position above and below the supporting units A—A' and the middle connecting strip 14 and these additional rails or strips 22 and 23, respectively, are of fixed length and relatively as long as the combined length of middle strip 14 and the two spring arms 4 of the supporting units when assembled and clamped together. The upper and lower fender strips may rest upon or bear against the shanks of bolts 17, thereby being spaced apart parallelly their full length from the middle strip and spring arms 4, and the opposite ends of rear clamping plate 7 may be bent forwardly to permit spring clamping engagement to be made with the rear faces of the upper and lower rails or strips 22 and 23, respectively, see Fig. 7. The middle connecting strip 14 may be omitted providing the upper and lower fender rails are clamped to the supporting units to connect them rigidly together and suitable flat filler pieces are seated in grooves 20 of clamping members 18, but a substantially closed impact area throughout the length and height of the guard is deemed more desirable than a guard with an open center in order to avoid possible entry or an entanglement with other types of end guarding devices in general use, especially single bar bumpers or buffers. In the present guard, a relatively wide fending face is obtained vertically by arranging the fending strips in triplicate order horizontally and parallelly edge to edge; and an effective cushioning result with stout resistance to shocks is effected by employing the elliptical units having the lateral spring arms and connecting the main fending strips with the loop portions of these units substantially as shown in the drawings and set forth herein.

What I claim is:

1. A resilient guard for an automobile, comprising elliptical supporting units having fending arms extending laterally therefrom, together with a main fending strip connected to said units.

2. A resilient guard for an automobile, comprising duplicate supporting units each made of spring strap metal folded to form a resilient base loop and a lateral spring fending arm, together with a main fending portion connected with said units.

3. A resilient guard for an automobile, comprising end units each made of strap metal folded into an elongated base loop with a laterally-extending free-flexing arm, a connecting strip for said end units, and means uniting said parts together.

4. A resilient guard for an automobile comprising elliptical spring supporting members having laterally-extending spring arms, and a plurality of main fender strips connecting said members.

5. A resilient guard for an automobile, comprising parallel upper and lower fender strips, supporting loops having extended fender portions occupying the space between said fender strips, and means uniting said parts together.

6. A resilient guard for an automobile, comprising parallel fender strips of spring metal vertically spaced apart, elongated supporting loops rearwardly of said fender strips having spring arms interposed between and co-extensive with the opposite ends of said strips, and clamping devices uniting said fender strips and loops together.

7. A resilient guard for an automobile, comprising upper and lower fender strips, a pair of elliptical supporting members folded to provide overlapping portions and free-flexing extensions horizontally interposed between said fender strips, a middle fender strip extending horizontally between said supporting members, and clamping devices connecting the said parts together.

8. A resilient guard for an automobile, comprising upper and lower fender strips, a pair of resilient supporting loops having spring arms corresponding to and extending parallelly between the opposite end of said strips and connected therewith, and a middle fender strip connected at its opposite ends with said loops.

9. A resilient guard for an automobile, comprising a pair of resilient supporting members each made of flat strip metal folded into elongated loop form with overlapping portions extending in opposite directions, horizontal fender strips above and below said members, and clamping devices embracing said overlapping portions and said upper and lower fender strips.

10. A resilient guard for an automobile, comprising a pair of resilient supporting members each made of a flat metal strip folded into elliptical loop shape with overlapping portions and a flexible fender extension, a connecting fender strip overlapping the front of the overlapping portions of said supporting members, and clamping devices uniting said overlapping parts together.

11. A resilient guard for an automobile, comprising a supporting unit made of a flat strip of metal folded into elliptical form, having an inner overlapped portion terminating in an angular lip and an outer free-flexing lateral extension terminating in a rounded extremity.

In testimony whereof, I affix my signature hereto.

WILLIAM G. COX.

Witness:
DOROTHY MOSER.